(12) United States Patent
Boutet et al.

(10) Patent No.: US 8,991,444 B2
(45) Date of Patent: Mar. 31, 2015

(54) DEVICE FOR FUELING LAUNCHER THRUSTERS

(75) Inventors: Eric Boutet, Saint Marcel (FR); Jean-Luc Pattyn, Gaillon (FR); Francis Meyer, Venables (FR)

(73) Assignee: SNECMA, Paris (FR)

( * ) Notice: Subject to any disclaimer, the term of this patent is extended or adjusted under 35 U.S.C. 154(b) by 772 days.

(21) Appl. No.: 13/262,113

(22) PCT Filed: Mar. 26, 2010

(86) PCT No.: PCT/FR2010/050557
§ 371 (c)(1),
(2), (4) Date: Sep. 29, 2011

(87) PCT Pub. No.: WO2010/112736
PCT Pub. Date: Oct. 7, 2010

(65) Prior Publication Data
US 2012/0024421 A1 Feb. 2, 2012

(30) Foreign Application Priority Data
Mar. 30, 2009 (FR) .................................... 09 51958

(51) Int. Cl.
*B65B 3/00* (2006.01)
*B64G 5/00* (2006.01)
*B64G 1/40* (2006.01)

(52) U.S. Cl.
CPC .. *B64G 5/00* (2013.01); *B64G 1/402* (2013.01)
USPC ........................................ 141/59; 141/311 R

(58) Field of Classification Search
CPC ....................................................... B65B 3/00

USPC ............ 141/59, 311 R, 382, 383, 311 A, 348, 141/349, 384, 385, 386, 387, 388, 389, 390, 141/391, 392; 244/171.6, 172.2, 172.3
See application file for complete search history.

(56) References Cited

U.S. PATENT DOCUMENTS

| | | | | |
|---|---|---|---|---|
| 2,533,640 | A * | 12/1950 | Ulrich ...................... | 137/614.04 |
| 3,045,721 | A * | 7/1962 | Shepherd et al. ............. | 141/346 |
| 3,112,672 | A * | 12/1963 | Webb ........................... | 89/1.811 |
| 3,164,165 | A * | 1/1965 | Fox .............................. | 137/468 |
| 3,216,466 | A * | 11/1965 | Simko .......................... | 141/226 |

(Continued)

FOREIGN PATENT DOCUMENTS

| | | | |
|---|---|---|---|
| EP | 0 146 684 | 7/1985 | |
| FR | 2943626 A1 * | 10/2010 | ............... B64G 5/00 |

*Primary Examiner* — Jason K Niesz
*Assistant Examiner* — Andrew Schmid
(74) *Attorney, Agent, or Firm* — Preti Flaherty Beliveau & Pachios LLP

(57) ABSTRACT

A fueling device for fueling the thrusters of a launcher is disclosed. The device includes a ground module and an on-board module. The ground module having at least: a ground pipe; a ground valve; and a ground plate provided with a ground passage, and the on-board module having at least: an on-board pipe; an on-board valve; and an onboard plate provided with an on-board passage. The device also includes a hydraulic coupling system between the onboard module and the ground module enabling fluid communication to be established between the ground passage and the on-board passage. A first annular enclosure is situated between the on-board plate and the ground plate around the hydraulic coupling system that, when connected to suction, enables the on-board plate and the ground plate to be held in a connected-together position.

15 Claims, 10 Drawing Sheets

(56) References Cited

U.S. PATENT DOCUMENTS

| | | | | |
|---|---|---|---|---|
| 3,217,762 A | * | 11/1965 | Burchett | 141/349 |
| 3,249,013 A | * | 5/1966 | Pride, Jr. et al. | 89/1.811 |
| 3,261,483 A | * | 7/1966 | Calabretta | 414/146 |
| 3,501,059 A | * | 3/1970 | Van Der Lely | 222/627 |
| 3,530,906 A | * | 9/1970 | Wright et al. | 141/59 |
| 3,763,747 A | * | 10/1973 | Beichel et al. | 92/33 |
| 3,863,688 A | * | 2/1975 | Millar et al. | 141/59 |
| 4,567,924 A | * | 2/1986 | Brown | 141/207 |
| 5,117,876 A | * | 6/1992 | Kuntz | 141/7 |
| 5,301,723 A | * | 4/1994 | Goode | 141/82 |
| 5,404,909 A | * | 4/1995 | Hanson | 137/614.06 |
| 5,404,923 A | * | 4/1995 | Yamamoto et al. | 141/279 |
| 5,765,612 A | * | 6/1998 | Morin | 141/383 |
| 5,904,302 A | * | 5/1999 | Brown | 239/586 |
| 6,125,871 A | * | 10/2000 | Drab et al. | 137/15.05 |
| 6,142,194 A | * | 11/2000 | McClaran | 141/346 |
| 6,405,768 B1 | * | 6/2002 | McClaran | 141/346 |
| 7,082,750 B2 | * | 8/2006 | Knight | 60/259 |
| 7,194,853 B1 | * | 3/2007 | Knight | 60/259 |
| 7,257,940 B1 | * | 8/2007 | Knight | 60/259 |
| 7,681,482 B1 | * | 3/2010 | Kubinski et al. | 89/1.811 |
| 8,820,353 B2 | * | 9/2014 | Yandle et al. | 137/614.04 |
| 2001/0054818 A1 | * | 12/2001 | Fujikawa et al. | 285/18 |
| 2002/0014279 A1 | * | 2/2002 | Shumaker et al. | 141/386 |
| 2004/0055642 A1 | * | 3/2004 | Valentian | 137/341 |
| 2004/0129906 A1 | * | 7/2004 | Authelet et al. | 251/12 |
| 2004/0148925 A1 | * | 8/2004 | Knight | 60/259 |
| 2005/0151107 A1 | * | 7/2005 | Shu | 251/214 |
| 2005/0247352 A1 | * | 11/2005 | Kamiya et al. | 137/614.04 |
| 2008/0216640 A1 | * | 9/2008 | Brand et al. | 89/47 |
| 2008/0315038 A1 | * | 12/2008 | Wyatt | 244/135 R |
| 2010/0018608 A1 | * | 1/2010 | Huegerich et al. | 141/388 |
| 2011/0127395 A1 | * | 6/2011 | Ostendarp | 248/205.8 |
| 2012/0024421 A1 | * | 2/2012 | Boutet et al. | 141/311 R |
| 2012/0080563 A1 | * | 4/2012 | Gryniewski et al. | 244/172.5 |

\* cited by examiner

DEVICE FOR FUELING LAUNCHER THRUSTERS

TECHNICAL FIELD

The invention relates to a device for fueling thrusters, in particular the cryogenic thrusters of a launcher, the device enabling the filling pipework to be separated on launcher lift-off.

BACKGROUND

Such a fueling device serves to fill the cryogenic thrusters with propellants and to do so up to the moment of lift-off. This constraint leads to a certain number of technical difficulties, since the pipework connecting the ground to the launcher must be reliably disconnected at the moment of launch, and this must take place without modifying the trajectory of the launcher and without interfering with the equipment that remains on the ground or the equipment that is on board the cryogenic stage or any other stage of the launcher.

Conventionally, cryogenic arms are used that are fitted with valve plates. These valve plates, which provide an on-board/ground connection, enable various filling and pressurizing operations to be performed that are needed for launch checking and preparation. They comprise an on-board plate and a ground plate, both of which are fitted with valves that serve to close the hydraulic and pneumatic circuits on board and on the ground (for filling, and purging/degassing).

These independent plates are mechanically connected together during the production stage and they are mounted together on the launcher during the integration stage. They are mechanically and permanently separated at the end of the launch countdown shortly before operation is checked in a manner that might potentially lead to the launch being aborted.

This unlocking between the ground and on-board plates is performed by using unlocking actuators that have two portions that are made movable relative to each other when pressure is applied to the actuator. These portions are fastened respectively to the ground plate and to the on-board plate so they are moved apart from each other when the unlocking actuators are pressurized. Thereafter, as a result of the weight of the plates and of the hoses that are attached thereto and as a result of the traction exerted by a dedicated extraction cable while the launcher is climbing, the ground and on-board plates pivot about a hinge pin that connects them together until the hinge pin is released, thereby leading to the ground and on-board plates being separated.

Thus, in the event of a launch being aborted as a result of the engines malfunctioning, such that the launcher has not climbed, an irreversible separation has occurred to the ground/on-board connection, with the ground pipework being dropped.

Consequently, with such equipment, since reconnection is not possible, it is no longer possible to empty the launcher in normal manner and it is necessary to change the ground/on-board connection once the launch has been aborted.

Such a change of the ground/on-board connection includes replacing the valve plate and involves a complete reconfiguration of the propellant circuit, including emptying the tanks, which can take a very large amount of time (about one week).

In addition, the operation of disengaging the cryogenic arms during a launch is difficult to perform: if the arm is retracted a little too late, even though that does not unbalance the launcher, there exists a risk of damaging the fueling device both in the ground installations and in the installations on board the launcher.

Brief Summary

An object of the present invention is to provide a device for fueling the thrusters of a launcher that enables the drawbacks of the prior art to be overcome, in particular by making it possible to establish reconnection in the event of a launch being aborted.

To this end, according to the present invention the fueling device is characterized in that it comprises:
- a ground module comprising at least: a ground pipe for connection upstream to a source of fluid; a ground valve connected downstream to the ground pipe; and a ground plate including a ground passage connected to said ground valve;
- an on-board module comprising at least: an on-board pipe for connecting downstream to the tanks of the thrusters; an on-board valve connected upstream to the on-board pipe; and an on-board plate including an on-board passage connected to said on-board valve; and
- a hydraulic coupling system between the on-board module and the ground module enabling fluid communication to be established between the ground passage and the on-board passage, and a first annular enclosure situated between the on-board plate and the ground plate around the hydraulic coupling system so that, when connected to suction, it enables the on-board plate and the ground plate to be held in a connected-together position.

In this way, it can be understood that the presence of the first annular enclosure makes it possible to conserve hydraulic coupling between the on-board module and the ground module so long as suction is maintained.

Thus, by maintaining this suction in the first annular enclosure until the moment the launcher climbs and lifts off, the connection is conserved between the on-board module and the ground module, even if the launch is aborted.

This solution also presents an additional advantage of further making it possible to maintain the connection between the on-board module and the ground module by using means that are extremely simple and reliable.

Overall, by means of the solution of the present invention, it is possible in the event of a launch being aborted to avoid any need to replace and/or reassemble all or part of the coupling system connecting the on-board module to the ground module, thereby representing a very significant saving in time, equipment, and manpower.

BRIEF DESCRIPTION OF DRAWINGS

Other advantages and characteristics of the invention appear on reading the following description made by way of example and with reference to the accompanying drawings, in which:

FIGS. 1A to 3A are views analogous to those of FIGS. 1 to 3 for an alternative embodiment;

DETAILED DESCRIPTION

Figure 1:
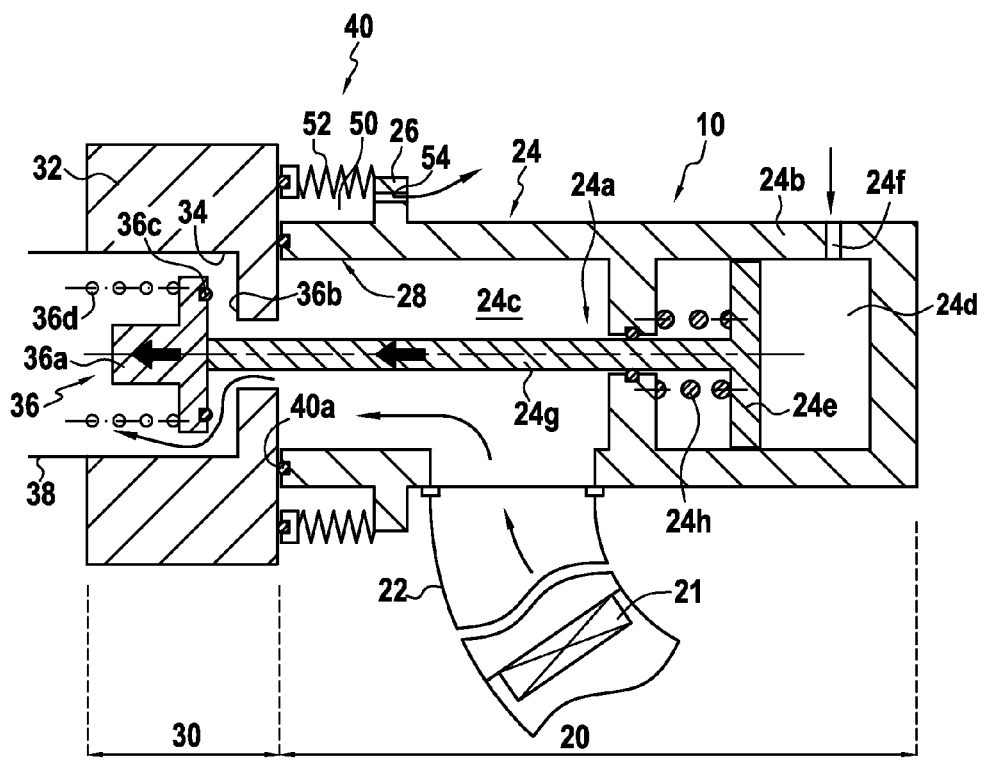
FIGS. 1 to 3 are diagrammatic longitudinal section views showing the principle of the fueling device of the invention during three successive stages.
Figure 2:
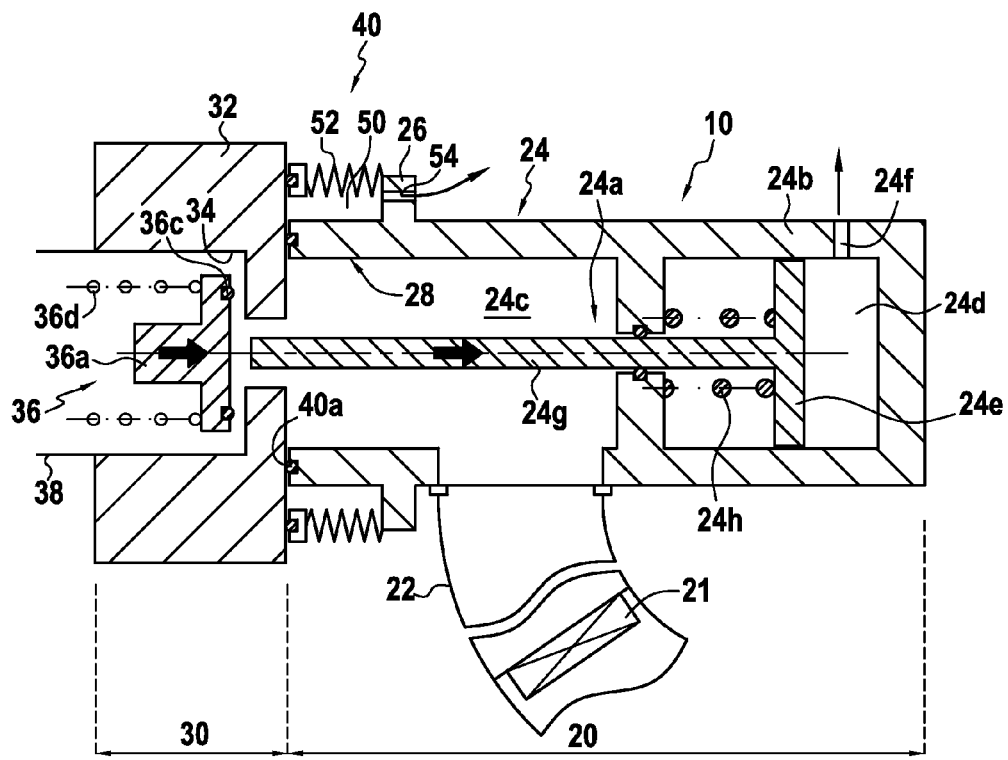
Figure 3A:
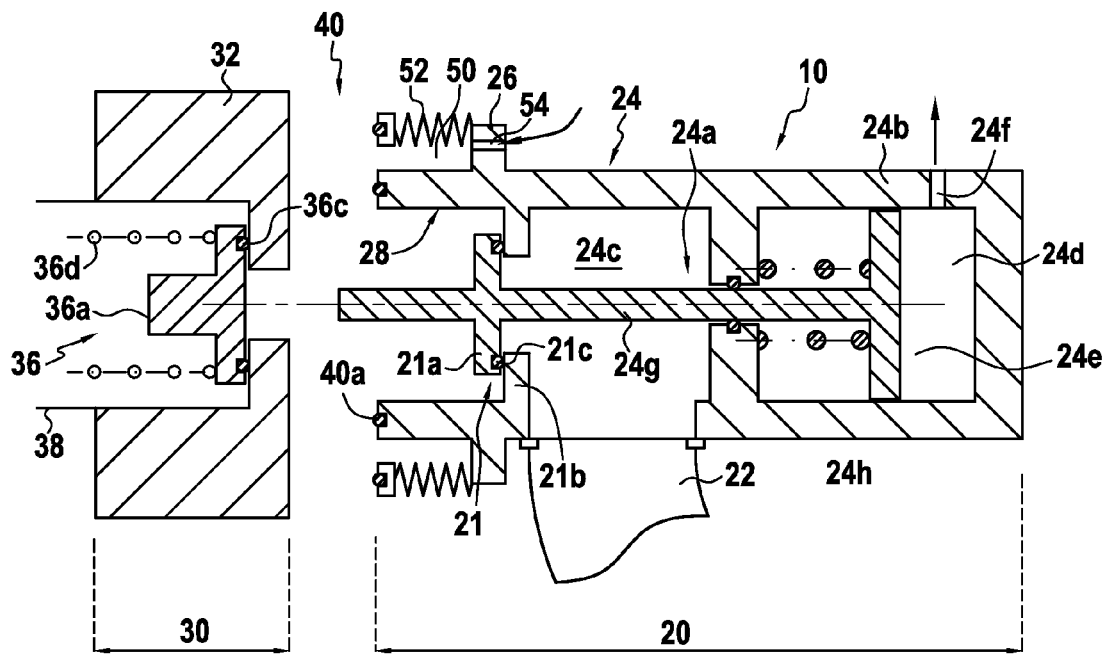
Figure 3:
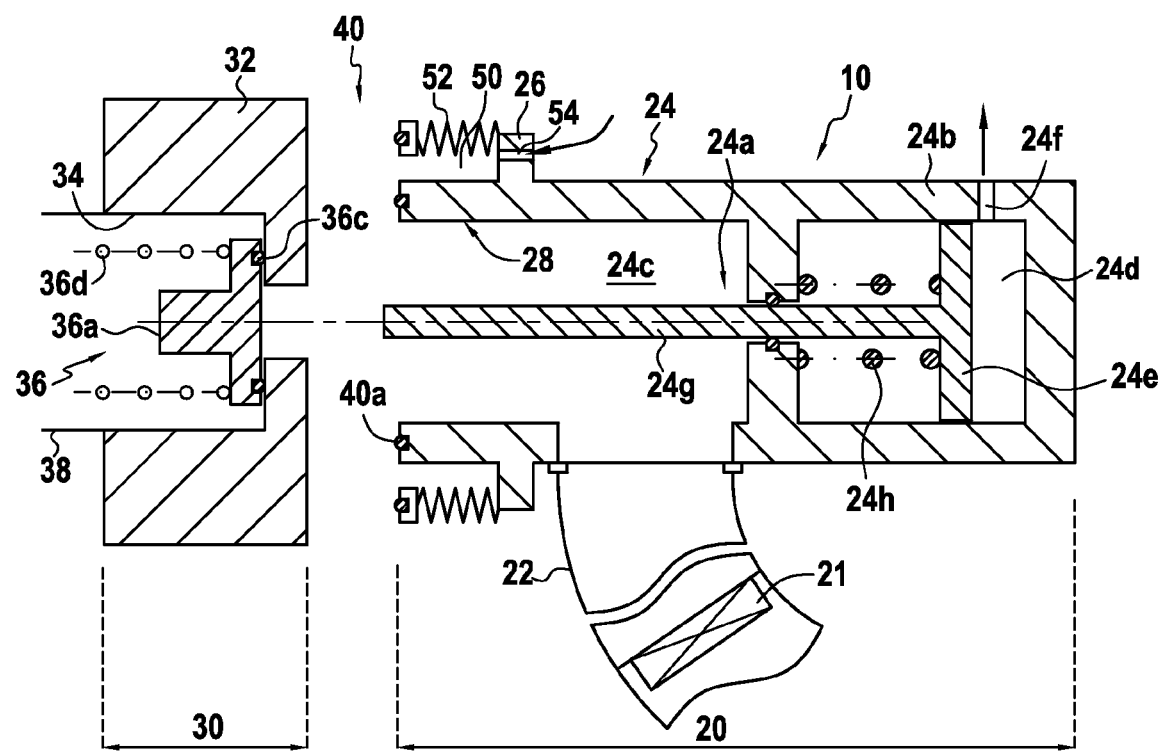
Figure 4:
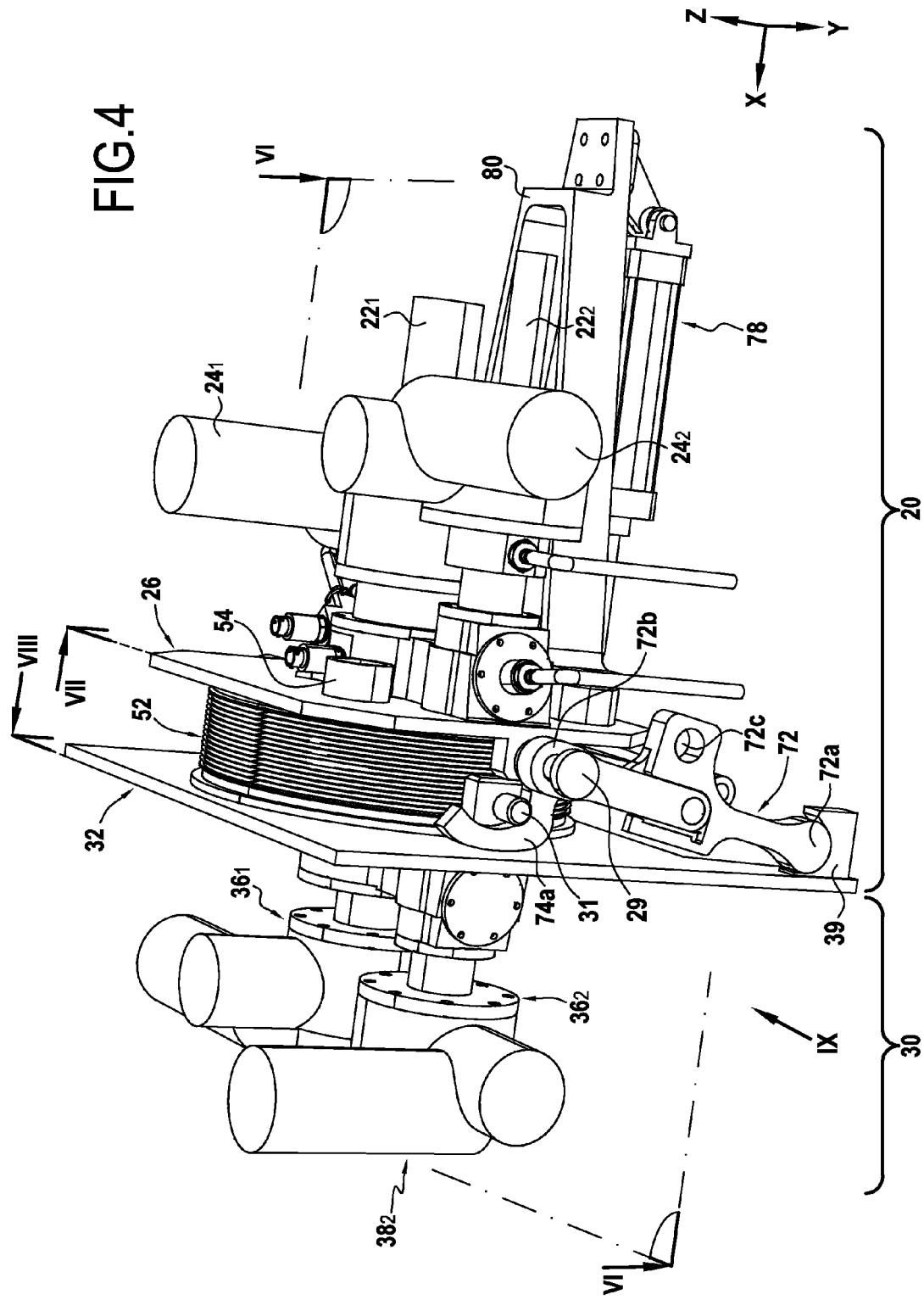
FIG. 4 is a general perspective view from the side of an embodiment of the fueling device of the invention.

Reference is made initially to FIGS. 1 to 3 which are diagrams showing the principle of the invention with a fueling device 10 comprising a ground module 20, to the right in the figures, and an on-board module 30, to the left in the figures.

In FIG. 1, the ground and on-board modules 20 and 30 are in position connected to each other and the fueling circuit is open to allow the tanks to be fed with fluid.

From upstream to downstream in the direction of arrows that show the flow of the fuel fluid, the ground module 20 comprises a ground valve 21 housed in or opening out into a ground pipe 22 placed upstream from a source of fuel fluid (not shown), a ground control unit 24, and a ground plate 26 including a ground passage 28 leading to the on-board module 30.

The ground control unit 24 is shown in the form of an actuator having a piston 24a that is slidably movable in a cylinder 24b that defines two chambers: a front chamber 24c connected to the ground pipe 22 and a rear chamber 24d in which the piston head 24e is housed. An opening 24f in the rear chamber 24d enables gas under pressure to enter therein, thereby enabling the piston head 24e to advance into an advanced position, driving the piston rod 24g to the left in FIG. 1, into the on-board module 30, thereby placing an on-board valve 36 in an open position, the valve member 36a of the on-board valve 36 being beforehand in a closed position. The rear chamber 24d also includes return means (here a coil spring 24h) serving to return the piston 24a into a rear position which corresponds to a closed position for the on-board valve 36 (FIGS. 2 and 3) when the pressure of gas in the rear chamber 24d decreases.

The on-board plate 26 surrounds the front portion of the cylinder 24b of the piston 24a defining the ground passage 28 extending the front chamber 24c.

From upstream to downstream in the direction of arrows representing the flow of fuel fluid (from right to left in the Figures), the on-board module 30 comprises an on-board plate 32 defining a passage 34 that, in FIGS. 1 and 2, extends the ground passage 28, and comprises also the on-board valve 36 and an on-board pipe 38 connected to the cryogenic tanks.

The on-board valve 36 is shown in the form of a valve member 36a or plug suitable for closing the on-board passage 34, having a portion that forms the seat 36b of the on-board valve 36, and an O-ring 36c serving to improve sealing between the valve member 36a and the seat 36b when the on-board valve 36 is in the closed position (FIG. 3).

As can be seen in FIG. 1, when the piston 24a is in the front position, the end of the piston rod 24g penetrates into the on-board passage 34 and pushes against the on-board valve 36 that opens, thereby enabling fluid situated in the front chamber 24c and coming from the ground pipe 22 to penetrate into the on-board passage 34, and to flow round the on-board valve 36 and into the on-board pipe 38.

In FIG. 2, because of a drop of pressure in the rear chamber 24d (gas exhausted via the opening 24f) and because of the return action of the coil spring 24h, the piston head 24e and the piston rod 24g return to the rear position, thereby enabling the on-board valve 36 to close, which valve is shown in its closed position in FIG. 3.

Return means (here a coil spring 36d) serve to return the on-board valve 36 to the closed position in which the on-board passage 34 is no longer in fluid communication with the ground passage 28 (FIG. 3).

Under such circumstances, opening/closing control of the ground valve 21 is independent of opening/closing control of the on-board valve 36.

Figure 1A:
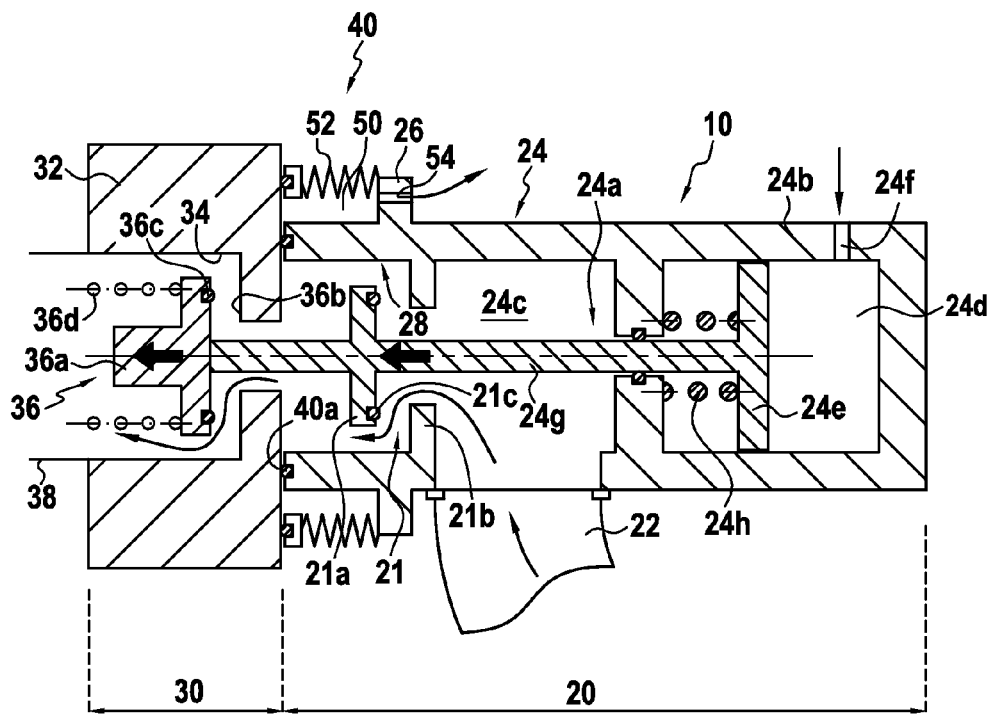
Figure 1B:
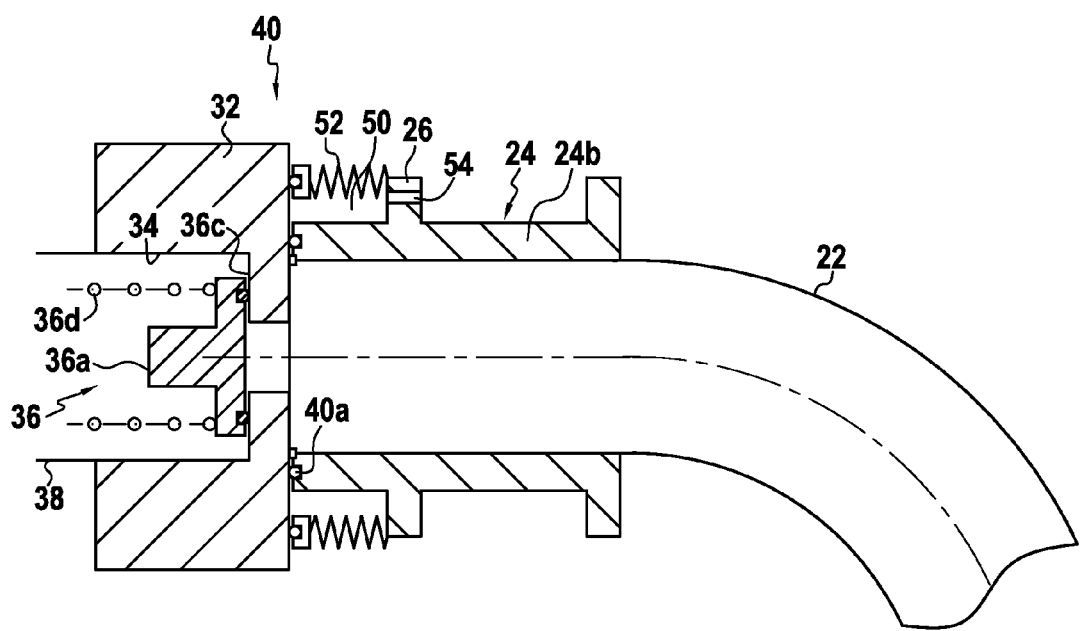
FIG. 1B is a view analogous to the view of FIG. 1 for another alternative embodiment.

With reference to FIGS. 1A to 1C, there can be seen a variant embodiment that differs from the embodiment of FIGS. 1 to 3 by the fact that the ground valve 21 is housed in the front chamber 24c and is also controlled by the ground control unit 24. The ground valve 21 comprises an annular valve member 21a securely mounted around the piston rod 24g and an annular seat 21b mounted on the inside face of the wall of the cylinder 24b, behind the valve member 21a. An O-ring 21c serves to improve sealing between the valve member 21a and the seat 21b when the ground valve 21 is in the closed position (FIGS. 2A and 3A).

Forward movement of the piston rod 24g (to the left in FIGS. 1A to 3A) serves, by moving both the valve member 36a of the on-board valve 36 and the valve member 21a of the ground valve 21 in a forward direction, to open simultaneously the on-board valve 36 and the ground valve 21.

Figure 2A:
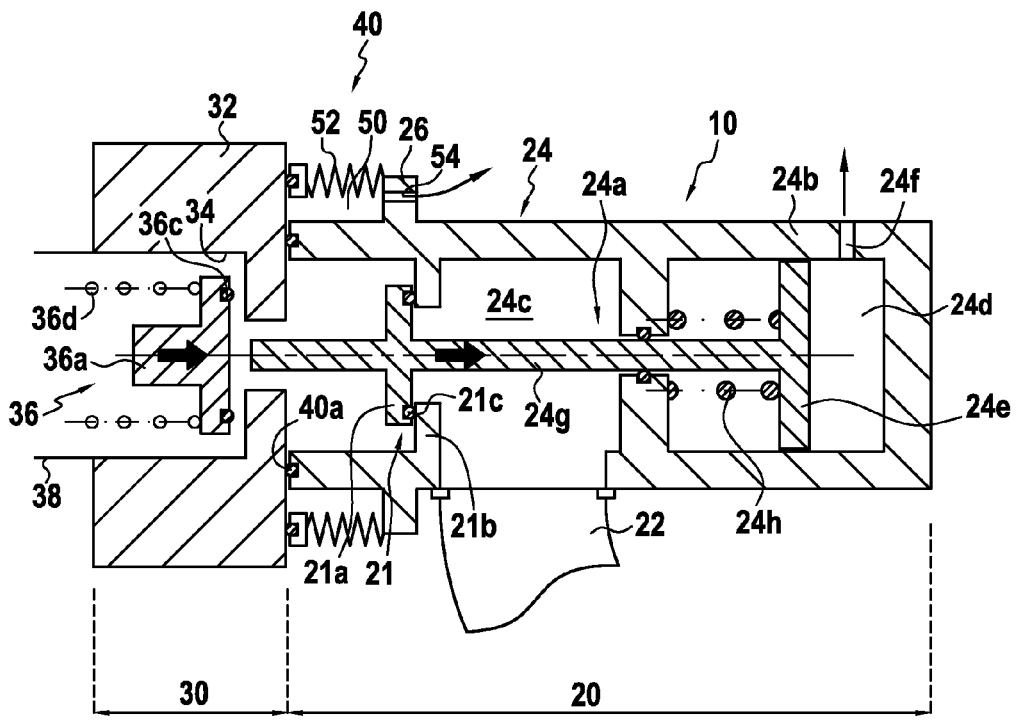

Conversely, rearward movement of the piston rod 24g enables the ground control unit 24 to close both the on-board valve 36 and the ground valve 21 simultaneously (FIGS. 2A and 3A).

Thus, in this embodiment, it can be understood that causing the ground valve 21 to open also causes the on-board valve 36 to open, and causing the ground valve 21 to close also causes the on-board valve 36 to close.

By inverting the positions of the piston head 24e and of the valve member 36a, it is possible to make provision for the command to open the on-board valve 36 also to cause the ground valve 21 to open, and for the command to close the on-board valve 36 also to cause the ground valve 21 to close.

In alternative embodiments that are not shown, instead of controlling the movement of the piston rod 24g pneumatically, it is naturally possible to use other types of control, such as electric controls.

Furthermore, FIGS. 1 and 1A show the situation in which the opening 24f leads into the rear portion of the rear chamber 24d, while the coil spring 24h bears against the piston head 24e by being housing in the front portion of the rear chamber 24d, however this arrangement could be inverted (opening 24f leading into the front portion of the rear chamber 24d and coil spring 24h housed in the rear portion of the rear chamber 24d). It is also possible to use two openings leading respectively into the front portion and into the rear portion of the rear chamber 24d, which openings are suitable for delivering gas at different pressures, thereby enabling the piston head 24e and the piston rod 24g to be caused to move forwards or rearwards.

In another alternative embodiment, shown in FIG. 1B, a simple technical solution is provided: the ground control unit 24 is constituted by no more than the cylinder 24b defining a single chamber without a piston that is connected to the ground pipe 22. In this configuration, it is the pressure of the fluid penetrating via the ground pipe that serves to move the valve member 36a and to open the on-board valve 36. The ground valve (not shown) is situated upstream from the hydraulic coupling system 40. In a variant, provision may also be made (configuration not shown) for the on-board valve 36 to be placed further downstream in the hydraulic coupling system 40: thus, each of the ground valve 21 and the on-board valve 36 has its own control unit.

The ground module 20 and the on-board module 30 are connected to each other via a hydraulic coupling system 40 that comprises an annular gasket 40a providing sealing between the ground module 20 and the on-board module 30 (between the on-board plate 32 and the ground plate 26).

According to an essential characteristic of the invention, a first annular enclosure 50 surrounds the hydraulic coupling system 40, which enclosure is suitable for being connected to suction.

As can be seen in FIG. 1, this first annular enclosure 50 extends between the ground plate 26 and the on-board plate 32 (respectively to the right and to the left in FIGS. 1 to 3).

The first annular enclosure 50 is defined in an outward radial direction by a first annular bellows 52 surrounding the hydraulic coupling system 40 and having its end bearing in leaktight manner against the on-board plate 32 and the ground plate 26.

In order to enable the first enclosure 50 to be connected to suction, the ground plate includes an opening 54 leading into said first enclosure 50 and suitable for being connected to suction means (not shown).

Thus, so long as the first enclosure 50 is connected to suction, i.e. presents a pressure value that is lower than atmospheric pressure (e.g. a pressure value lying in the range 0.5 bar to 0.7 bar), the ground plate 26 and the on-board plate 32 are held in connection by a suction-cup effect, thereby enabling the ground module 20 and the on-board module 30 to be kept connected together (see FIGS. 1 and 2, 1A and 1B, and 1C).

In FIGS. 3 and 3A, the gas pressure is increased in the first annular enclosure 50 by injecting gas via the opening 54 so that the ground and on-board modules 20 and 30 are disconnected and become mutually separable, e.g. during launcher climb. This increase in the gas pressures inside the first annular enclosure 50 may involve applying atmospheric pressure or a higher pressure (a pressure higher than atmospheric pressure).

It can thus be seen that the invention makes it very simple, merely by having a negative pressure difference between the first annular enclosure 50 and the outside, to keep the ground module 20 and the on-board module 30 connected together, this connection being opened by varying the pressure inside the first annular enclosure 50 (connecting it to atmospheric pressure or to a higher pressure).

Reference is now made to FIGS. 4 to 9 which show more particularly an embodiment of the fueling device 10. Below, reference signs that are already used above are used again to designate portions of the fueling device that are already mentioned above.

This embodiment has two parallel flow paths for feeding and discharging fluid, e.g. making it possible to fill simultaneously the cryogenic tanks with different propellants (different in chemical nature and/or physical state), and in particular with a liquid propellant and a gaseous propellant, e.g. liquid oxygen via one part and gaseous oxygen in parallel via the other.

For this purpose (see FIGS. 4 to 6):
the ground module 20 has a first ground pipe $22_1$ designed to be connected upstream (to the right in the figures) to a first fluid source, a first ground valve $24_1$ connected to the first ground pipe $22_1$ downstream therefrom, a second ground pipe $22_2$ designed to be connected upstream to a second fluid source, and a second ground valve $24_2$ connected to the second ground pipe $22_2$ downstream therefrom, the ground plate 26 being provided with a first ground passage $28_1$ connected to said first ground valve $24_1$ and a second ground passage $28_2$ connected to the second ground valve $24_2$;

the on-board module 30 has a first on-board pipe $38_1$ designed to be connected downstream to a first tank, a first on-board valve $36_1$ connected to the first on-board pipe $38_1$ at the downstream end thereof, a second on-board pipe $38_2$ for connection upstream to a second tank, and a second on-board valve $36_2$ connected to the second on-board pipe $38_2$ at the upstream end thereof, the on-board plate 32 being provided with a first on-board passage $34_1$ connected to said first on-board valve $36_1$ and with a second on-board passage $34_2$ connected to the second on-board valve $36_2$; and the hydraulic coupling system 40 enables fluid communication to be established firstly between the first ground passage $28_1$ and the first on-board passage $34_1$, and secondly between the second ground passage $28_2$ and the second on-board passage $34_2$.

More precisely, in this embodiment as shown, the two parallel flow paths for feeding fluid are coaxial. To this end, the first ground passage $28_1$ and the second ground passage $28_2$ are mutually coaxial, as are the first on-board passage $34_1$ and the second on-board passage $34_2$, at least over a segment of said passages $28_1$, $28_2$, $34_1$, $34_2$.

In this respect, in the ground module 20 (see FIGS. 4, 6, and 7), the first ground assembly formed by the first ground pipe $22_1$ and the first ground valve $24_1$ is situated parallel beside the second ground assembly formed by the second ground pipe $22_2$ and the second ground valve $24_2$. This first ground assembly is mounted on the ground plate 26 at a first location forming the opening of the first ground passage $28_1$ that is rectilinear all the way to its outlet. This second ground assembly is mounted on the ground plate 26 at a second location forming the opening of the second ground passage $28_2$ that presents, successively in line with one another, a first rectilinear portion $28_2a$ that is parallel to the axis X and to the second ground pipe $22_2$, a second rectilinear portion $28_2b$ that is substantially parallel to the axis Y that extends at almost right angles from the first portion $28_2a$ towards the first ground passage $28_1$, and an annular third portion $28_2c$ that extends as far as the outlet of the second ground passage $28_2$ and that surrounds the downstream portion of the first ground passage $28_1$ (see FIG. 7).

In the on-board module 30 (see FIGS. 4, 6, and 8), the first on-board assembly formed by the first on-board pipe $38_1$ and the first on-board valve $36_1$ is situated parallel beside the second on-board assembly formed by the second on-board pipe $38_2$ and the second on-board valve $36_2$. This first on-board assembly is mounted on the on-board plate 32 at a first location forming the opening of the first on-board passage $34_1$ and it is rectilinear all the way to its outlet. This second on-board assembly is mounted on the on-board plate 32 at a second location forming the opening of the second on-board passage $34_2$ and that presents, successively in line with one another, a rectilinear first portion $34_2a$ parallel to the axis X and to the second on-board pipe $38_2$, a rectilinear second portion $34_2b$ substantially parallel to the axis Y and extending at almost right angles relative to the first portion $34_2a$ towards the first on-board passage $34_1$, and an annular third portion $34_2c$ that extends as far as the outlet of the second on-board passage $34_2$ and that surrounds the downstream portion of the first on-board passage $34_1$ (see FIG. 7).

Figure 6:
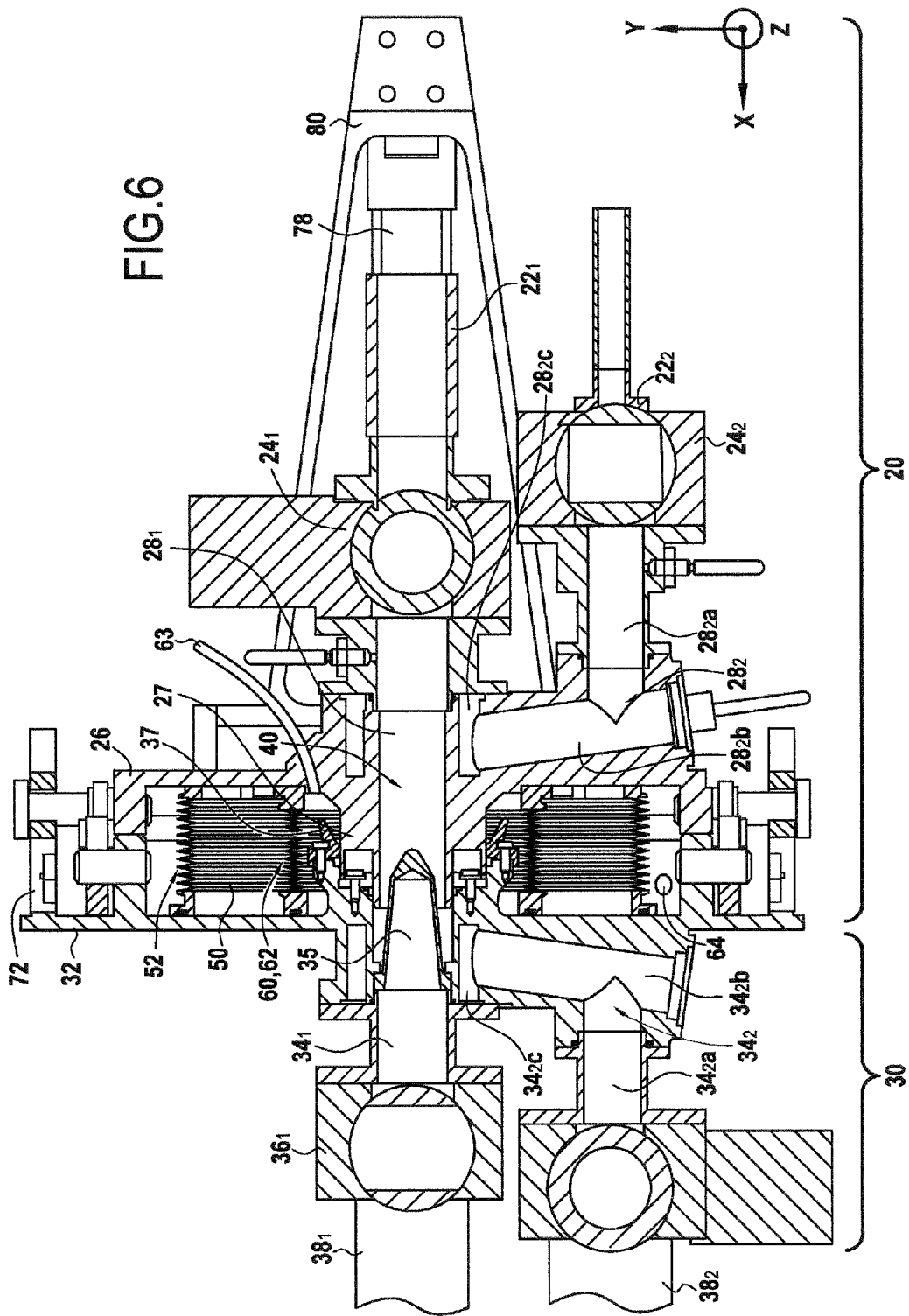
FIG. 6 is a section view on a horizontal plane of the fueling device seen in direction VI of FIG. 4.
Figure 7:
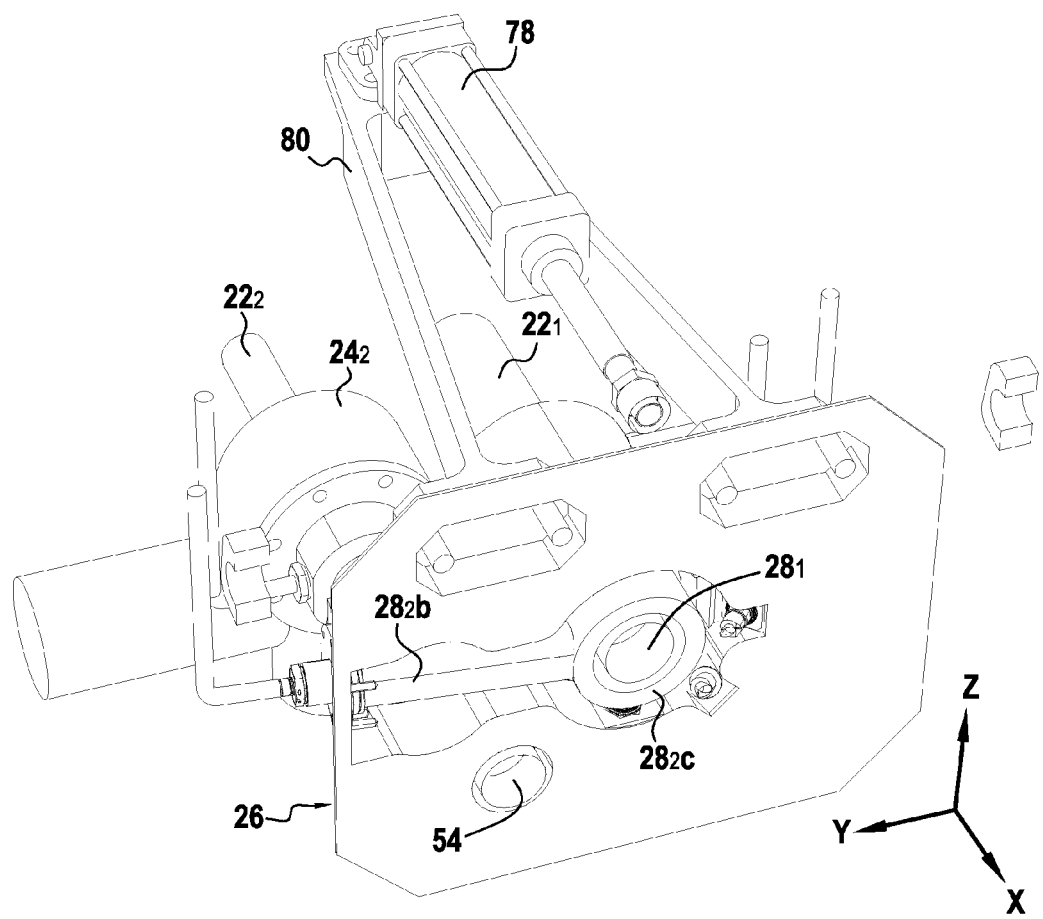
FIG. 7 is a section view on a transverse vertical pane of the fueling device from direction VII of FIG. 4, level with the ground plate.
Figure 8:
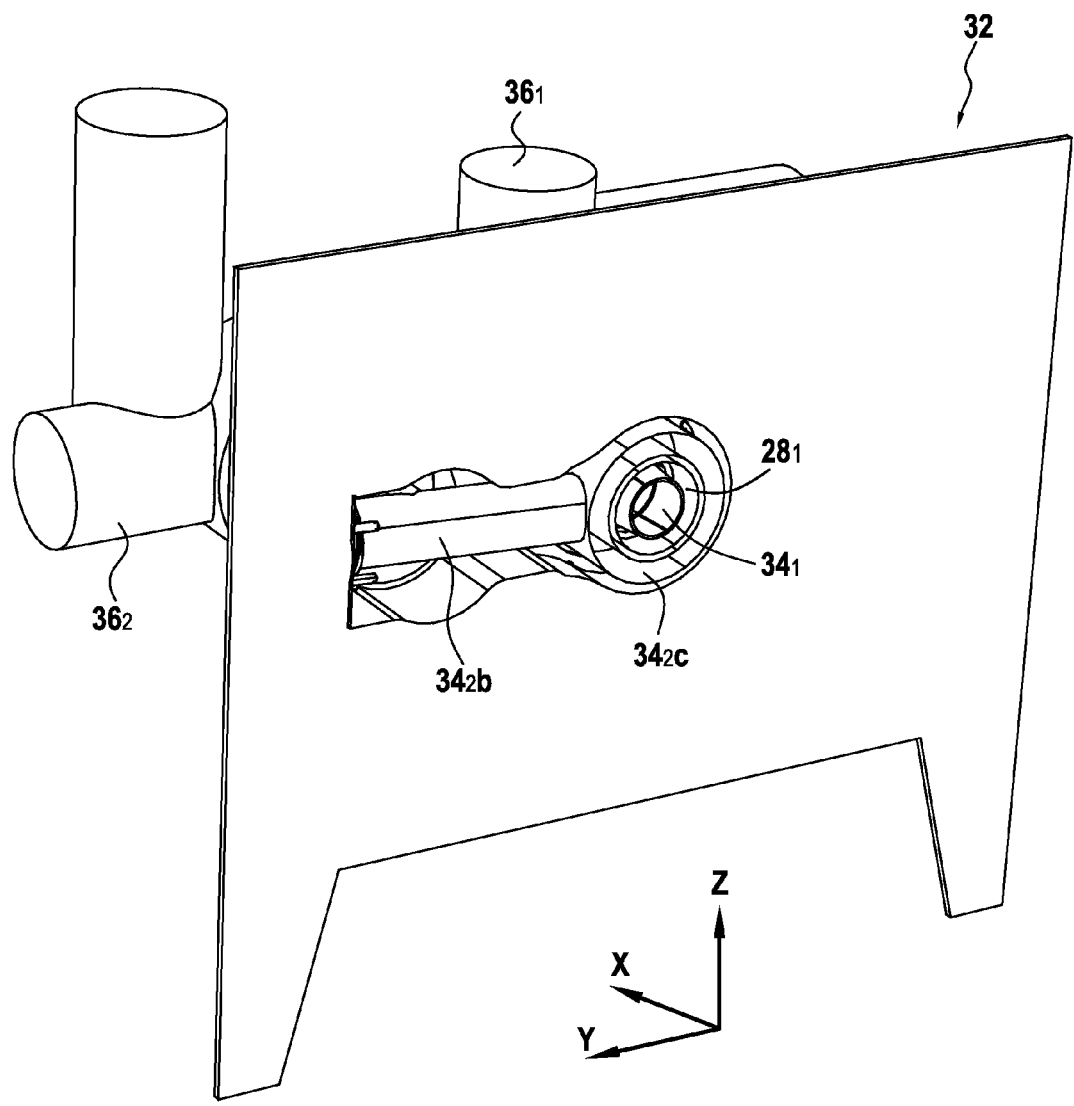
FIG. 8 is a section view on a transverse vertical plane of the fueling devices seen from direction VIII of FIG. 4, level with the on-board plate.
Figure 9:
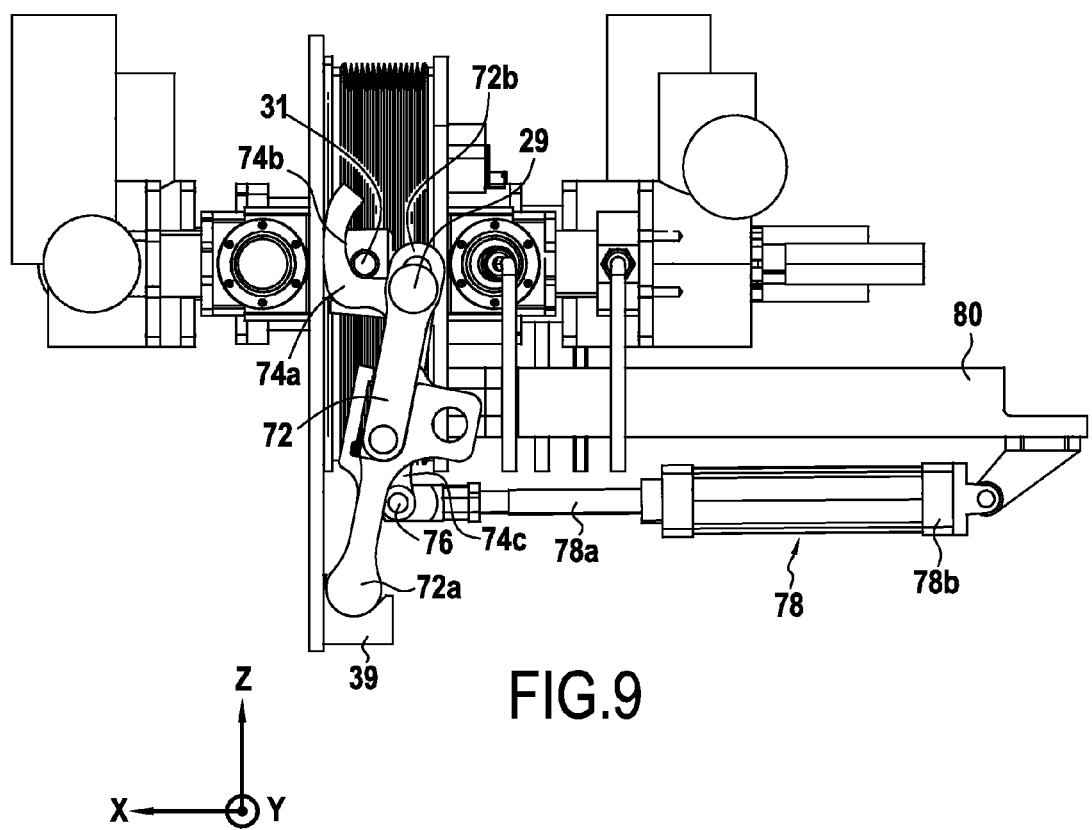
FIG. 9 is a section view on an axial vertical plane of the fueling device seen from direction IX of FIG. 4, at the front of a locking finger.

In this way, and as can be seen in FIG. 6, when the ground module 20 and the on-board module 30 are in the connected-together position, the following are to be found in alignment parallel to the axis X, going from right to left:

firstly the first ground pipe $22_1$, the first ground passage $28_1$ (surrounded in part by the annular third portion $28_2c$ of the second ground passage $28_2$), the first on-board passage $34_1$ (surrounded in part by the annular third portion $34_2c$ of the second on-board passage $34_2$), and the first on-board pipe $38_1$, that are in fluid communication to allow the first fuel fluid to pass from a source placed on the ground towards the tank on board the launcher; and secondly the annular third portion $28_2c$ of the second ground passage $28_2$ and the annular third portion $34_2c$ of the second on-board passage $34_2$ that are in fluid communication in line with one another to allow the second fuel fluid to pass coaxially and outside the flow of the first fuel fluid.

Figure 5:
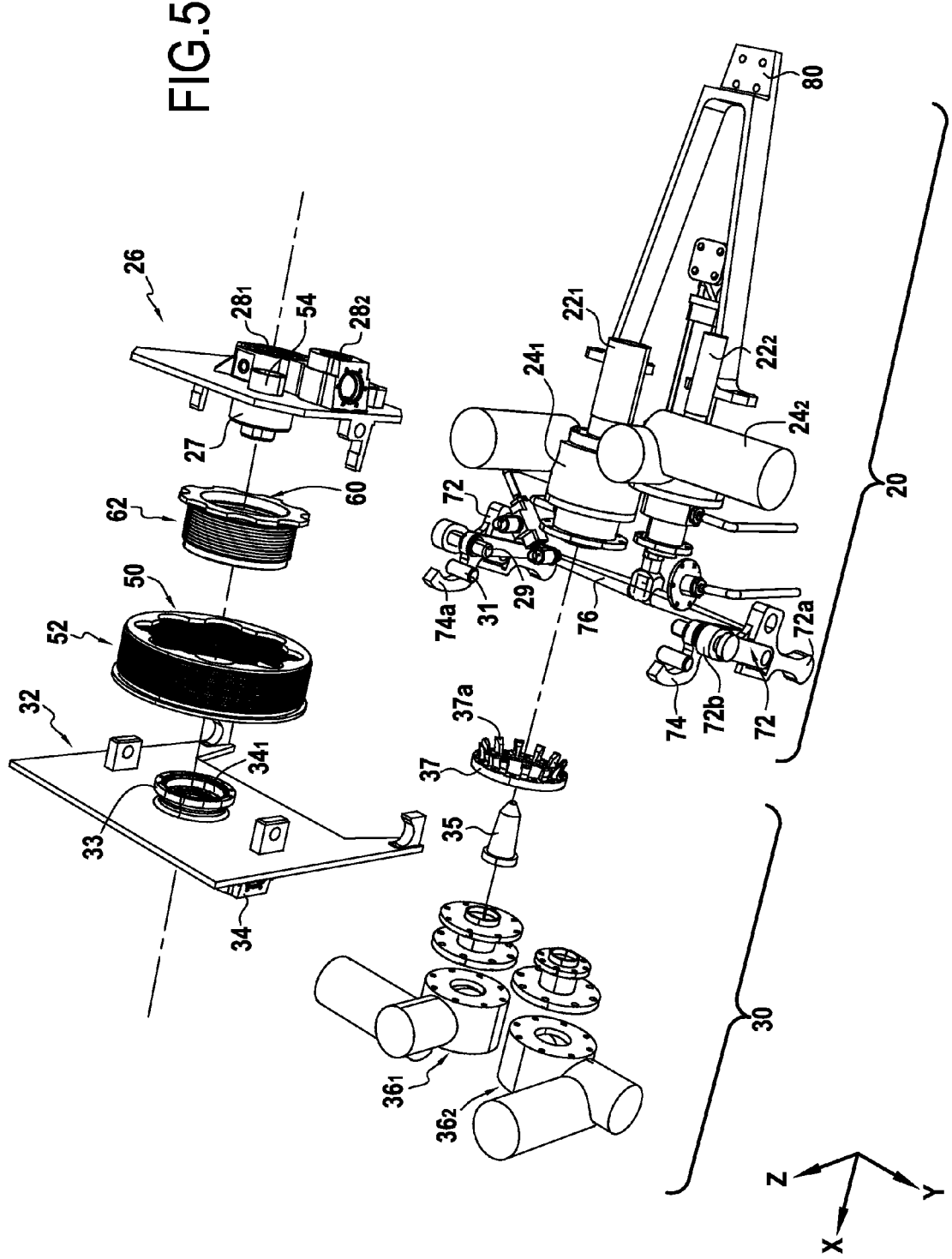
FIG. 5 is a perspective view from above of the FIG. 4 fueling device, with some of its parts shown exploded.

In FIGS. 5 and 6, a filter 35 is located inside the first on-board passage $34_1$ that is intended more particularly for passing a liquid, in order to avoid particles polluting the fluid flow passage downstream from the fueling device 10.

As can be seen in FIG. 6, the valves (first ground valve $24_1$, second ground valve $24_2$, first on-board valve $36_1$, and second on-board valve $36_2$) are ball valves. Naturally, it is possible to envisage using valves of other types, such as flap valves.

The hydraulic coupling system 40 is described below with reference to FIGS. 5 and 6: around the inlet of the first on-board passage $34_1$ in the on-board plate 32, a threaded annular collar 33 receives a centralizing annular cover 37 by screw-fastening, with the free end 37a thereof that points away from the on-board plate 32 being crenellated and flared. This free end 37a serves to receive a projecting annular portion 27 formed on the face of the ground plate 26 that faces towards the on-board module 30 by surrounding said projecting annular portion 27, which itself surrounds the downstream portion of the first ground passage $28_1$.

The hydraulic coupling system 40 thus essentially comprises the annular collar 33 of the on-board plate 32, the centralizing annular cover 37, and the projecting annular portion 27 of the ground plate 26.

To improve sealing, the outer annular faces of the annular collar 33 and of the centralizing annular cover 37 are provided with respective O-rings.

A first annular enclosure 50 defined radially on the outside by the first annular bellows 52 (see FIGS. 4 to 6) surrounds the hydraulic coupling system 40. The opening 54 of the first ground plate is axially in line (along the X axis) with the first annular enclosure 50 and by being connected to suction means (e.g. a pump) it serves to apply suction to the first annular enclosure 50. In this situation, the end walls of the first annular bellows 52 that are covered in an O-ring are "stuck" against the facing faces of the ground and on-board plates 26 and 32, thereby creating a suction-cup type connection.

The fueling device 10 of FIGS. 5 to 9 further includes a second annular enclosure 60 suitable for being connected to high pressure, the second enclosure being situated between the on-board plate 32 and the ground plate 26 around the hydraulic coupling system 40 and around which the first annular enclosure 50 is located.

This second annular enclosure 60 is defined radially on the outside by a second annular bellows 62 (see FIGS. 4 to 6) that surrounds the hydraulic coupling system 40 and that is itself surrounded by the first annular bellows 52. The second annular enclosure 60 is pressurized by means of a dedicated feed (duct 63 in FIG. 6) that enables an inert gas under pressure to be introduced via an opening in the ground plate 26: this avoids any dangerous substances penetrating into the suction zone.

Maintaining the second annular enclosure 60 under pressure does not compromise maintaining the ground module 20 and the on-board module 30 in a connected position since the first annular enclosure 50 is outside the second annular enclosure 60 and is of a size that is sufficient to ensure that the suction inside the first annular enclosure maintains coupling between the on-board module 30 and the ground module 20.

The extra pressure in the second annular enclosure 60 makes it possible, where necessary, to condition the hydraulic coupling system 40, i.e. to add an anti-frosting system thereto in the form of a flow of gas (dry air or nitrogen) outside the first bellows 52 (duct 64 in FIG. 6), thereby making it possible to avoid ice forming, in particular in the zone of contact between the first bellows 52 and the on-board plate 32.

The fueling device 10 of FIGS. 5 to 9 also includes, between the on-board plate 32 and the ground plate 26, a mechanical locking system 70 that suitable for opening while the launcher is climbing when lifting off, or beforehand.

To this end, the mechanical locking system 70 includes, on either side of the first annular enclosure 50, a release fork 72 having a bottom end 72a bearing against the on-board plate 32 in the connected position via a receiver portion 39 against which the bottom end 72a bears via a complementary shape, while the top end 72b of the release fork 72 is pivotally mounted about a ground pin 29 secured to the ground plate 26 so that pivoting of the release fork 72 about the ground pin 29 moves the ground plate 26 apart from the on-board plate 32 or gives rise to a cracking point on the structure on which the ground plate 32 is fastened (until the moment when the bottom end 72a escapes from the receiver portion 39), and vice versa.

Thus, conversely, moving the ground plate 26 apart from the on-board plate 32 causes the release fork 72 to pivot about the ground pin 29 until the moment when the bottom end 72a escapes from the receiver portion 39 and opens the mechanical locking system 70. This is what happens when the launcher climbs and it leads to the ground module 20 being separated from the on-board module 30: at that moment there is normally no longer any suction in the first annular enclosure 50, but should it happen that such suction remains in the first annular enclosure 50, then given the forces exerted while the launcher is lifting off, the suction will not prevent the ground module 20 being separated from the on-board module 30.

To this end, the release fork 72 is provided between its bottom end 72a and its top end 72b with a hole enabling a sling to be attached thereto, the other end of the sling being fastened to the ground. In this manner, while the launcher is climbing, the ground module 20 is thus retained and separated from the on-board module which is secured to the launcher.

Furthermore, the mechanical locking system 70 includes, on either side of the first annular enclosure 50, a locking finger 74 (see FIG. 9) that is movable in pivoting about the ground pin 29 between an open position (not shown) that does not hold the ground plate 26 and the on-board plate 32 together, and a closed position (FIGS. 4 and 6) in which the ground plate 26 and the on-board plate 32 are held together by the fact that the housing 74b defined by the top end 74a of the locking finger 74 receives an on-board pin 31 secured to the on-board plate 32.

The mechanical locking system 70 also includes a connection shaft 76 connecting together the bottom ends 74c of the locking fingers 74 and having mounted thereon (via a hinge)

the free end of the piston rod 78a of a control actuator 78 serving to actuate opening or closing of the locking fingers 74.

The cylinder 78b of the control actuator 78 is mounted at the rear of the ground plate 26 by means of a V-shaped actuator support 80 projecting at right angles from the rear of the ground plate 26.

Thus, in normal operation, the actuator 78 serves to release the on-board pins 31 from the locking fingers 74 and thus enables the ground module 20 to be separated from the on-board module 30 while the launcher is climbing.

What is claimed is:

1. A fueling device for fueling thrusters of a launcher, the device being characterized in that it comprises:
   a ground module comprising at least: a ground pipe for connection upstream to a source of fluid; a ground valve connected downstream to the ground pipe; and a ground plate including a ground passage connected to said ground valve;
   an on-board module comprising at least: an on-board pipe for connecting downstream to tanks of the thrusters; an on-board valve connected upstream to the on-board pipe; and an on-board plate including an on-board passage connected to said on-board valve;
   a hydraulic coupling system between the on-board module and the ground module enabling fluid communication to be established between the ground passage and the on-board passage, and a first annular enclosure situated between the on-board plate and the ground plate around the hydraulic coupling system so that, when connected to suction, it enables the on-board plate and the ground plate to be held in a connected-together position, and
   a ground actuator unit comprising a piston slidably movable in a cylinder that defines two chambers: a front chamber connected to the ground pipe and a rear chamber in which a piston head is housed, the rear chamber further comprising return means adapted to return the piston into a rear position which corresponds to a closed position for the on-board valve, and further being connect to pressure means for driving the piston in order to place the on-board valve on an open position.

2. The fueling device according to claim 1, wherein said first enclosure is defined by a first annular bellows surrounding the hydraulic coupling system and having its ends bearing against the on-board plate and the ground plate.

3. The fueling device according to claim 1, wherein the ground plate includes an opening leading into said first enclosure and suitable for being connected to suction means.

4. The fueling device according to claim 1, further including a second annular enclosure suitable for being connected to high pressure, and situated between the on-board plate and the ground plate around the hydraulic coupling system with the first annular enclosure being situated around the second annular enclosure.

5. The fueling device according to claim 1, wherein a command to open the ground valve gives rise to a command to open the on-board valve, and a command to close the ground valve gives rise to a command to close the on-board valve.

6. The fueling device according to claim 1, wherein a command to open the on-board valve gives rise to a command to open the ground valve, and a command to close the on-board valve gives rise to a command to close the ground valve.

7. The fueling device according to claim 1, further including between the on-board plate and the ground plate, a mechanical locking system suitable for opening while the launcher is lifting off, or prior thereto.

8. The fueling device according to claim 7, wherein the mechanical locking system includes, on either side of the first annular enclosure, a release fork having a bottom end bearing against the on board plate in the connected position while the top end of the release fork is mounted to pivot about a ground pin secured to the ground plate in such a manner that pivoting of the release fork about the ground pin gives rise to the ground plate and the on-board plate being moved apart, and vice versa.

9. The fueling device according to claim 8, wherein the mechanical locking system further includes, on either side of the first annular enclosure, a locking finger movable in pivoting about the ground pin between an open position that does not hold together the ground plate and the on-board plate, and a closed position in which the ground plate and the on-board plate are held together by the fact that the housing defined by the top end of the locking finger receives an on board pin secured to the on-board plate.

10. The fueling device according to claim 9, wherein the mechanical locking system further includes a connection shaft connecting together the bottom ends of the locking fingers and having the free end of the piston rod of the piston of a control actuator mounted thereon.

11. The fueling device according to claim 1, wherein:
   the ground module includes a first ground pipe for connecting upstream to a first fluid source, a first ground valve connected downstream to the first ground pipe, a second ground pipe for connecting upstream to a second fluid source, and a second ground valve connected downstream to the second ground pipe, the ground plate being provided with a first ground passage connected to said first ground valve and with a second ground passage connected to the second ground valve;
   the on-board module includes a first on-board pipe for connecting downstream to a first tank, a first on-board valve connected upstream to the first on-board pipe, a second on-board pipe for connecting downstream to a second tank, and a second on-board valve connected upstream to the second on-board pipe, the on-board plate being provided with a first on-board passage connected to said first on-board valve and with a second on-board passage connected to the second on-board valve; and
   the hydraulic coupling system serves to establish fluid communication firstly between the first ground passage and the first on-board passage, and secondly between the second ground passage and the second on-board passage.

12. The fueling device according to claim 11, wherein the first ground passage and the second ground passage are coaxial relative to each other, as are the first on-board passage and the second on-board passage, over at least a segment of said passages.

13. A fueling device for fueling thrusters of a launcher, the device being characterized in that it comprises:
   a ground module comprising at least: a ground pipe for connection upstream to a source of fluid; a ground valve connected downstream to the ground pipe; and a ground plate including a ground passage connected to said ground valve;
   an on-board module comprising at least: an on-board pipe for connecting downstream to tanks of the thrusters; an on-board valve connected upstream to the on-board pipe; and an on-board plate including an on-board passage connected to said on-board valve;
   a hydraulic coupling system between the on-board module and the ground module enabling fluid communication to be established between the ground passage and the onboard passage, and a first annular enclosure situated between the on-board plate and the ground plate around the hydraulic coupling system so that, when connected to suction, it enables the on-board plate and the ground plate to be held in a connected-together position, and
a ground actuator unit comprising a piston slidably movable in a cylinder that defines two chambers: a front chamber connected to the ground pipe and a rear chamber in which a piston head is housed, the rear chamber further comprising return means adapted to return the piston into a rear position which corresponds to a closed position for the on-board valve, and further being connect to pressure means for driving the piston in order to place the on-board valve on an open position,
further including a second annular enclosure suitable for being connected to high pressure, and situated between the on-board plate and the ground plate around the hydraulic coupling system with the first annular enclosure being situated around the second annular enclosure.

14. A fueling device for fueling thrusters of a launcher, the device being characterized in that it comprises:
a ground module comprising at least: a ground pipe for connection upstream to a source of fluid; a ground valve connected downstream to the ground pipe; and a ground plate including a ground passage connected to said ground valve;
an on-board module comprising at least: an on-board pipe for connecting downstream to tanks of the thrusters; an on-board valve connected upstream to the on-board pipe; and an on-board plate including an on-board passage connected to said on-board valve; and
a hydraulic coupling system between the on-board module and the ground module enabling fluid communication to be established between the ground passage and the on-board passage, and a first annular enclosure situated between the on-board plate and the ground plate around the hydraulic coupling system so that, when connected to suction, it enables the on-board plate and the ground plate to be held in a connected-together position,
further including between the on-board plate and the ground plate, a mechanical locking system suitable for opening while the launcher is lifting off, or prior thereto, wherein:
the mechanical locking system includes, on either side of the first annular enclosure, a release fork having a bottom end bearing against the on-board plate in the connected position while the top end of the release fork is mounted to pivot about a ground pin secured to the ground plate in such a manner that pivoting of the release fork about the ground pin gives rise to the ground plate and the on-board plate being moved apart, and vice versa, and
the mechanical locking system further includes, on either side of the first annular enclosure, a locking finger movable in pivoting about the ground pin between an open position that does not hold together the ground plate and the on-board plate, and a closed position in which the ground plate and the on-board plate are held together by the fact that the housing defined by the top end of the locking finger receives an on-board pin secured to the on-board plate.

15. The fueling device according to claim 14, wherein the mechanical locking system further includes a connection shaft connecting together the bottom ends of the locking fingers and having the free end of the piston rod of the piston of a control actuator mounted thereon.

* * * * *